United States Patent
Yuanzhu

(10) Patent No.: US 7,440,739 B2
(45) Date of Patent: Oct. 21, 2008

(54) SMART ANTENNA DEVICE WITH INCREASED OPERATION SPEED AND COMPLEX SMART ANTENNA DEVICE USING SMART ANTENNA DEVICE

(75) Inventor: Dou Yuanzhu, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 504 days.

(21) Appl. No.: 11/302,066

(22) Filed: Dec. 13, 2005

(65) Prior Publication Data
US 2006/0126571 A1 Jun. 15, 2006

(30) Foreign Application Priority Data
Dec. 14, 2004 (JP) ............... 2004-361858

(51) Int. Cl.
H04B 1/06 (2006.01)
(52) U.S. Cl. ............... 455/273; 455/276.1; 455/278.1; 455/65; 375/347
(58) Field of Classification Search .......... 455/273
See application file for complete search history.

(56) References Cited

U.S. PATENT DOCUMENTS 5,781,845 A * 7/1998 Dybdal et al. ............... 455/65
5,949,833 A * 9/1999 Weerackody ............... 375/347

FOREIGN PATENT DOCUMENTS

JP 11-284423 10/1999
JP 2002-198878 7/2002

* cited by examiner

Primary Examiner—Lana N. Le
Assistant Examiner—Ajibola Akinyemi
(74) Attorney, Agent, or Firm—Brinks Hofer Gilson & Lione

(57) ABSTRACT

A smart antenna device includes: first and second weighting units provided to correspond to two antennas disposed apart from each other so as to weight received signals inputted from the antennas, respectively; an operating unit that obtains a ratio of a weight of the second weighting unit to a weight of the first weighting unit; an adding unit that adds a signal outputted from the first weighting unit and a signal outputted from the second weighting unit to each other; and a phase shifting unit that makes phases of the two signals equal to each other.

7 Claims, 3 Drawing Sheets

SMART ANTENNA DEVICE WITH INCREASED OPERATION SPEED AND COMPLEX SMART ANTENNA DEVICE USING SMART ANTENNA DEVICE

BACKGROUND OF THE INVENTION

1. Field of the Invention

The present invention relates to a smart antenna device with improved reception quality obtained by adjusting a phase shift for signals received in a plurality of antennas and by weighting the signals, and a complex smart antenna device using a plurality of smart antenna devices.

2. Description of the Related Art

A smart antenna technique (or sometimes called as an adapting antenna technique) is a technique to adjust a phase shift for signals received in a plurality of antennas and weight the signals so as to maximize the S/N (signal-to-noise ratio) after the signals are added to each other. FIG. 7 shows a basic configuration of an adapting antenna device using such a technique.

In FIG. 7, reference numerals A1 to Ak denote antenna elements, reference numerals B1 to Bk denote A/D converters for performing an analog/digital conversion for signals received in the antenna elements A1 to Ak, reference numerals C1 to Ck denote a weighting part for multiplying the signals X(n) converted into digital signals by the A/D converters B1 to Bk by respective weights W1 to Wk, reference numeral 1 denotes an adder for adding results of the multiplication of the weighting parts C1 to Ck to output an output signal Y(n), and reference numeral 2 denotes a signal processing part that obtains an evaluation function Q(n) for evaluating distortion of amplitudes of the received signals X(n) from the output signal Y(n) output from the adder 1 and its envelope value s and updates the weights W(n) of the antenna elements A1 and Ak on the basis of the evaluation function Q(n).

First, the output signal Y(n) output from the adder 1 and the envelope value s are put in the calculation equation $Q(n) = (||Y(n)|p - s|q)$ (where, p and q are integers of 1 or 2) to obtain the evaluation function Q(n) for evaluating the distortion of the amplitudes of the received signals X(n).

After obtaining the evaluation function Q(n), the signal processing part 2 updates the weights W(n) of the received signals X(n) on the basis of the obtained evaluation Q(n) in order to minimize distortion of the received signals X(n). Specifically, the evaluation function Q(n) is partially differentiated with respect to a weight W(n), and a next weight W(n+1) is determined by using a result of the partial differentiation $\nabla wQ(n)$, according to the following equation.

$$W(n+1) = W(n) - \mu \cdot \nabla wQ(n)$$

Here, $\mu$ is a step size (a step width of evaluation).

The weight W(n) is a vector representing weights W1 to Wk at time n, and has normalized integers at an initial stage, as set in a manner that W1=1, W2=0, W3=0, ..., Wk=0.

Then, the weighting parts C1 to Ck weight the received signals X(n) by using the determined weight W(n+1) in order to minimize distortion of amplitudes of the received signals X(n). In addition, even if an interference wave having low power is derived from a desired signal wave, the interference wave is suppressed (for example, see JP-A-11-284423 (FIG. 5)).

In the conventional signal receiving unit, the weight W(n) to minimize the distortion of the amplitudes of the received signals X(n) is gradually updated, however, a weight W(1) at the initial stage is set as a normalized integer, so that a problem arises in that it takes a long time to obtain optimal weights W(n). In addition, since a weight operation is performed after digital conversion, a problem occurs where even more process time is required.

SUMMARY OF THE INVENTION

The invention is designed to solve the above problems, and it is an object of the invention to increase an operation speed by simply performing an optimal weight operation for two signals with an analog circuit.

In order to achieve the above object, according to an aspect of the invention, a smart antenna device includes: first and second weighting units provided to correspond to two antennas disposed apart from each other so as to weight received signals inputted from the antennas, respectively; an operating unit that obtains a ratio of a weight of the second weighting unit to a weight of the first weighting unit; an adding unit that adds a signal outputted from the first weighting unit and a signal outputted from the second weighting unit to each other; and a phase shifting unit that makes phases of the two signals equal to each other. When the magnitude of a signal component and the magnitude of a noise component of the signal inputted to the first weighting unit are assumed to be $S_1$ and $N_1$, respectively, and the magnitude of a signal component and the magnitude of a noise component of the signal inputted to the second weighting unit are assumed to be $S_2$ and $N_2$, respectively, the weight ratio is $(S_2/S_1) \times (N_1/N_2)^2$.

In the smart antenna device according to the aspect of the invention, preferably, the operating unit includes: a first division circuit that obtains a ratio of the magnitude of a signal component outputted from the second weighting unit to the magnitude of a signal component outputted from the first weighting unit; a second division circuit that obtains a ratio of the magnitude of a noise component outputted from the first weighting unit to the magnitude of a noise component outputted from the second weighting unit; a squaring circuit that squares an output value of the second division circuit; and a multiplication circuit that multiplies an output value of the first division circuit by an output value of the squaring circuit.

Further, preferably, the smart antenna device according to the aspect of the invention further includes: a first separating unit that separates the signal component outputted from the first weighting unit from the noise component outputted from the first weighting unit; and a second separating unit that separates the signal component outputted from the second weighting unit from the noise component outputted from the second weighting unit. The separated signal components are input to the first division circuit and the separated noise components are input to the second division circuit.

Furthermore, in the smart antenna device according to the aspect of the invention, preferably, each of the first and second separating units is composed of a first band pass filter and a second band pass filter, the first band pass filter passing within a band of the received signals and a second band pass filter passing outside of the band of the received signals.

In addition, preferably, the smart antenna device according to the aspect of the invention further includes a weight setting unit that sets weights of the first and second weight units. A signal representing the weight ratio is input to the weight setting unit.

Further, in the smart antenna device according to the aspect of the invention, preferably, each of the first and second weighting units is composed of a variable gain amplifier, and the weight setting unit is composed of a differential amplifier.

According to another aspect of the invention, a complex smart antenna device includes $2^N - 1$ (where, N is a positive integer of 2 or more) smart antenna devices described above. Output ports of two front-stage smart antenna devices are connected to input ports of a rear-stage smart antenna device in a cascading pyramid form, and the number of input ports is $2^N$ and the number of output ports is one.

DESCRIPTION OF THE PREFERRED EMBODIMENT

Hereinafter, a basic configuration of a smart antenna device of the invention and a theoretical method of configuring the smart antenna device will be described with reference to FIG. 1.

A received signal $P_1$ received in a first antenna (not shown) is input to a first weighting unit 1. In addition, a received signal $P_2$ received in a second antenna (not shown) disposed apart from the first antenna is input to a second weighting unit 2. The first weighting unit 1 and the second weighting unit 2 each are composed of, for example, a variable gain amplifier or a variable attenuator, and weight the received signals $P_1$ and $P_2$, respectively, on the basis of the gain or the amount of attenuation thereof. The received signals $P_1$ and $P_2$ have the same frequency.

One $P_1$ of the weighted received signals is directly input to an adding unit 4 and the other $P_2$ of the weighted received signals is input to the adding unit 4 through a phase shifting unit 3. The received signals $P_1$ and $P_2$ input to the adding unit 4 have the same phase.

Figure 1:
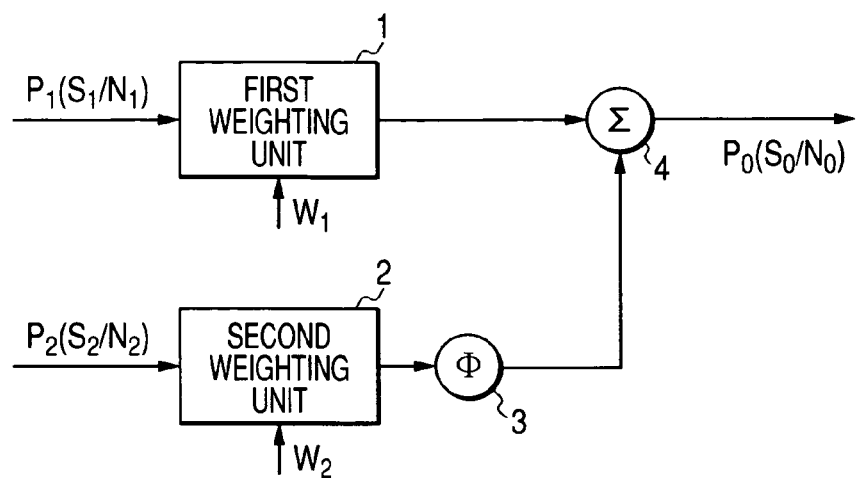
FIG. 1 is a view illustrating the basic configuration of a smart antenna device according to the invention.

Here, as shown in FIG. 1, it is assumed that the magnitude of a signal component and the magnitude of a noise component of the received signal $P_1$ input to the first weighting unit 1 are $S_1$ and $N_1$, respectively, and the magnitude of a signal component and the magnitude of a noise component of the received signal $P_2$ input to the second weighting unit 2 are $S_2$ and $N_2$, respectively. In addition, it is assumed that the weight for the first weighting unit 1 is $W_1$, the weight for the second weighting unit 2 is $W_2$, and the magnitude of a signal component and the magnitude of a noise component of a signal $P_0$ after addition by the adding unit 4 (referred to as an addition signal) are $S_0$ and $N_0$, respectively.

The signal component $S_0$ and the noise component $N_0$ depend on $W_1$ and $W_2$, respectively, and the signal component $S_0$ is expressed as the following Equation 1 under the condition of the same phase. The noise component $N_0$ has no correlation with the phase, and therefore, its temporal average value has a root square of sum of squares, as expressed as the following Equation 2.

$$S_0 = S_1 \times W_1 + S_2 \times W_2 \qquad \text{Equation 1}$$

$$N_0 = \{(N_1 \times W_1)^2 + (N_2 \times W_2)^2\}^{\frac{1}{2}} \qquad \text{Equation 2}$$

Accordingly, assuming that a ratio of the weight $W_2$ to the weight $W_1$ ($W_2/W_1$) is $\alpha$, a signal-to-noise ratio ($S_0/N_0$) of the addition signal $P_0$ is expressed as the following Equation 3.

$$\frac{S_0}{N_0} = \frac{S_1 + S_2 \times \alpha}{\{N_1^2 + (N_2 \times \alpha)^2\}^{\frac{1}{2}}} \qquad \text{Equation 3}$$

A condition to maximize $S_0/N_0$ on the left side of Equation 3 may be obtained by differentiating the right side of Equation 3 with respect to the ratio $\alpha$ and by making a result of the differentiation equal to zero. As a result, the ratio $\alpha$ is expressed as the following Equation 4, and the maximum value of $S_0/N_0$, $(S_0/N_0)_{Max}$, is expressed as the following Equation 5.

$$\alpha = \frac{S_2}{S_1} \times \left(\frac{N_1}{N_2}\right)^2 \qquad \text{Equation 4}$$

$$\left(\frac{S_0}{N_0}\right)_{MAX} = \frac{\{(S_1 \times N_2)^2 + (S_2 \times N_1)^2\}^{\frac{1}{2}}}{N_1 \times N_2} \qquad \text{Equation 5}$$

Figure 2:
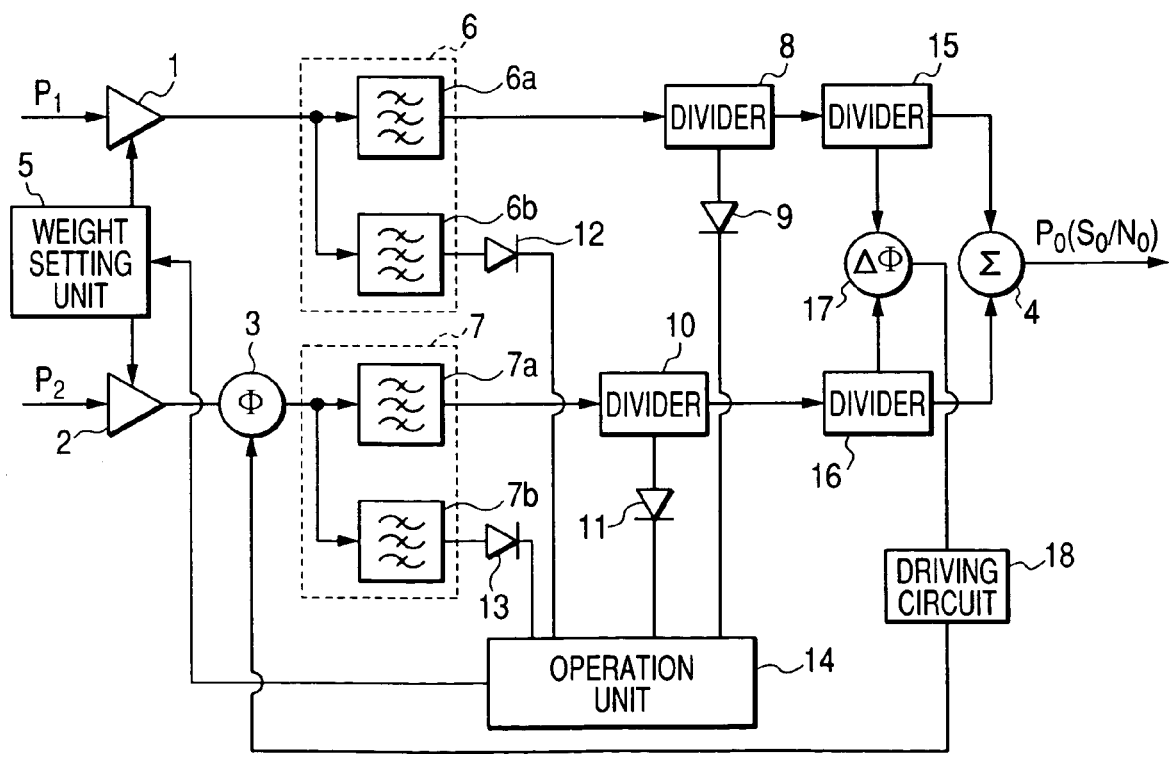
FIG. 2 is a circuit diagram illustrating an overall configuration of the smart antenna device according to the invention.

FIG. 2 is a detailed circuit diagram of the smart antenna device shown in FIG. 1. A weight setting unit 5 provides the weights $W_1$ and $W_2$ to the first weighting unit 1 inputted with the received signal $P_1$ and the second weighting unit 2 inputted with the received signal $P_2$, respectively. Specifically, the first and second weighting units 1 and 2 each are composed of a variable gain amplifier or a variable attenuator, and the weight setting unit 5 is composed of a differential amplifier.

The received signal $P_1$ weighted with the weight $W_1$ by the first weighting unit 1 and outputted therefrom is input to a first separating unit 6 provided at the next stage. The received signal $P_2$ weighted with the weight $W_2$ by the second weighting unit 2 and output therefrom is input to a second separating unit 7 through a phase shifting unit 3 provided at the next stage. The first separating unit 6 and the second separating unit 7 separate and extract the signal and noise components included in the received signals $P_1$ and $P_2$, respectively. The first separating unit 6 includes a first band pass filter 6a and a second band pass filter 6b disposed parallel to each other, and the second separating unit 7 includes a third band pass filter 7a and a fourth band pass filter 7b disposed parallel to each other.

The first band pass filter 6a and the third band pass filter 7a have the same structure and pass within a band of the received signals $P_1$ and $P_2$, respectively. Likewise, the second band pass filter 6b and the fourth band pass filter 7b have the same structure and pass outside of the band of the received signals $P_1$ and $P_2$, respectively. The first and third band pass filters 6a and 7a have the same pass bandwidth, and the second and fourth band pass filters 6b and 7b have the same pass bandwidth.

Accordingly, a signal component $S_1 \times W_1$ included in the received signal $P_1$ weighted with the weight $W_1$ is output from the first band pass filter 6a, and a noise component $N_1 \times W_1$ included in the received signal $P_1$ weighted with the weight $W_1$ is output from the second band pass filter 6b. Likewise, a signal component $S_2 \times W_2$ included in the received signal $P_2$ weighted with the weight $W_2$ is output from the third band pass filter 7a, and a noise component $N_2 \times W_2$ included in the received signal $P_2$ weighted with the weight $W_2$ is output from the fourth band pass filter 7b. Since the noise components $N_1 \times W_1$ and $N_2 \times W_2$ are equally distributed for a frequency axis and it is difficult to extract noise components within the band of the received signals, noise components outside the band of the received signals are extracted to be assumed to be the noise components $N_1 \times W_1$ and $N_2 \times W_2$ included in the received signals, respectively.

The signal component $S_1 \times W_1$ output from the first band pass filter 6a is distributed to a distributor 8, and part of the signal component $S_1 \times W_1$ is detected by a detector 9 to be provided to an operating unit 14. Likewise, the signal component $S_2 \times W_2$ output from the third band pass filter 7a is distributed to a distributor 10, and part of the signal component $S_2 \times W_2$ is detected by a detector 11 to be provided to the operating unit 14. In addition, the noise component $N_1 \times W_1$ output from the second band pass filter 6b and the noise component $N_2 \times W_2$ output from the fourth band pass filter 7b are detected by detectors 12 and 13, respectively, and then are provided to the operating unit 14.

Figure 3:
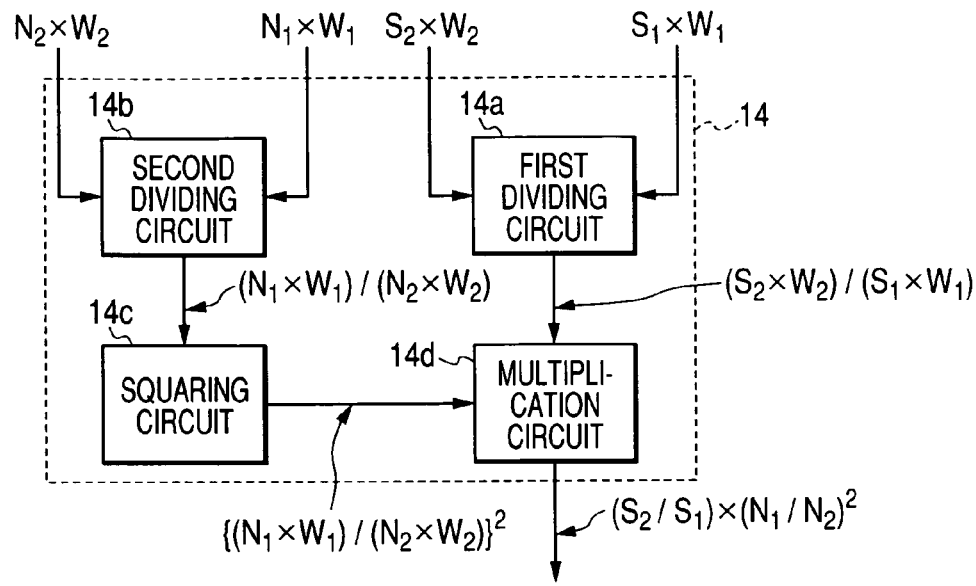
FIG. 3 is a view illustrating the configuration of an operation unit used in the smart antenna device according to the invention.

As shown in FIG. 3, the operating unit 14 is composed of a first division circuit 14a, a second division circuit 14b, a squaring circuit 14c, and a multiplication circuit 14d. Two signal components $S_1 \times W_1$ and $S_2 \times W_2$ are operated by the first division circuit 14a to be $(S_2 \times W_2)/(S_1 \times W_1)$. Two noise components $N_1 \times W_1$ and $N_2 \times W_2$ are operated by the second division circuit 14b to be $(N_1 \times W_1)/(N_2 \times W_2)$. The result of the operation output from the second division circuit 14b operated by the squaring circuit 14c is to be $\{(N_1 \times W_1)/(N_2 \times W_2)\}^2$. $\{(S_2 \times W_2)/(S_1 \times W_1)\} \times \{(N_1 \times W_1)/N_2 \times W_2)\}^2$ is obtained by the multiplication circuit 14d. As a result, $(S_2 \times S_1) \times (N_1/N_2)^2$ is obtained. This is the weight ratio $\alpha$ as shown in Equation 4.

It is well known in the art that the first division circuit 14a, the second division circuit 14b, the squaring circuit 14c, and the multiplication circuit 14d, which compose the operating unit 14, may be constituted by operational amplifiers or the like, and therefore, detailed explanation thereof will be omitted.

Figure 4:
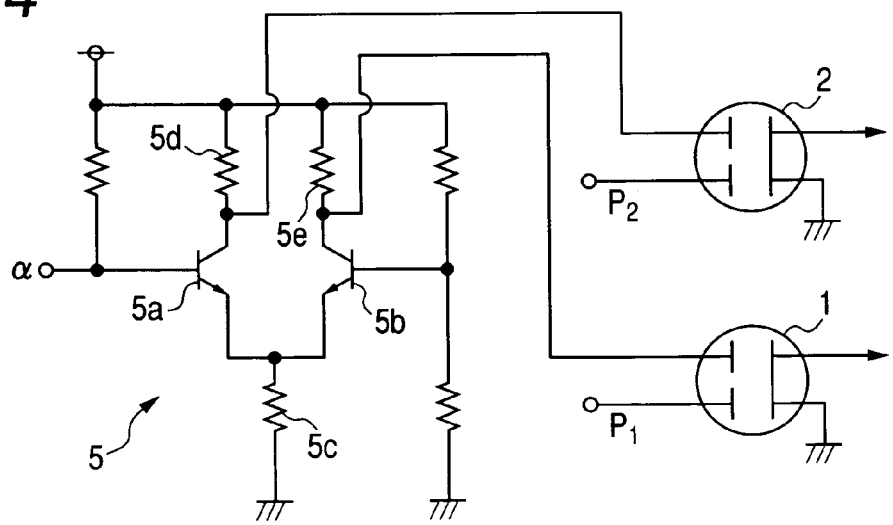
FIG. 4 is a circuit diagram illustrating an example of a weight distributing unit used in the smart antenna device according to the invention.

A signal (voltage) representing the weight ratio $\alpha$ obtained by the operating unit 14 is provided to the weight setting unit 5 that sets the weights. A detailed configuration of the weight setting unit 5, along with the first and second weighting units 1 and 2, are shown in FIG. 4. The weight setting unit 5 shown in FIG. 4 is constituted by a differential amplifier using two transistors 5a and 5b. Emitters of the transistors are coupled and grounded through a resistor 5c. Power is fed to collectors of the transistors through load resistors 5d and 5e, respectively, and the signal representing the weight ratio $\alpha$ is input to a base of the transistor 5a.

The first and second weighting units 1 and 2 are constituted by FETs (field effect transistor), respectively, for example. The received signals P1 and P2 are input to first gates G1 of the FETs, respectively, a second gate G2 of the first weighting unit 1 is connected to the collector of the transistor 5a, and a second gate G2 of the second weighting unit 2 is connected to the collector of the transistor 5b. Sources S of the FETs are grounded, and a weighted (i.e., gain-controlled) signal is output from drains D of the FETs.

With this configuration, as the weight ratio $\alpha$ becomes large, the collector voltage of the transistor 5a drops and the collector voltage of the transistor 5b rises. As a result, the gain of the first weighting unit 1 becomes large and the gain of the second weighting unit 2 becomes small.

The signal component $S_1 \times W_1$ output from the distributor 8 is provided to the phase difference detecting unit 17 and the adding unit 4 through a distributor 15. Likewise, the signal component $S_2 \times W_2$ output from the distributor 10 is also provided to the phase difference detecting unit 17 and the adding unit 4 through a distributor 16. A phase difference $\Delta\phi$ detected by the phase difference detecting unit 17 is provided to the phase shifting unit 3 through a driving circuit 18 including at least a low pass filter, and a phase of the signal component $S_2 \times W_2$ becomes equal to a phase of the signal component $S_1 \times W_1$. Accordingly, an amplitude of a signal component $(S_1 \times W_1) + (S_2 \times W_2)$ obtained by the adding unit 4 becomes maximized and its S/N ratio becomes maximized as shown in Equation 5.

As described above, in the smart antenna device of the invention, since the condition to maximize the S/N ratio through an operation is obtained with analog signals kept, that is, without converting the analog signals into digital signals when the received signals $P_1$ and $P_2$ are weighted, there is an advantage that a condition on the maximum S/N ratio can be obtained in real time. In addition, since the operation itself is performed by using known circuits, the smart antenna device of the invention can have a simple configuration.

Further, the phase shifting unit 3 may be provided at a receiving system to which the received signal $P_1$ is input. In addition, the phase shifting unit 3 may be provided at any stage previous to the phase difference detecting unit 16. In addition, if frequencies of the received signals $P_1$ and $P_2$ are too high, the received signals $P_1$ and $P_2$ may be input to the weighting unit 1 and 2 after being subject to a proper frequency conversion (down-conversion).

While the above-described smart antenna device is of a two-input type, a complex smart antenna device having more than four input ports may be configured by using a plurality of smart antenna devices. Specifically, the complex smart antenna device may be configured by using $2^N-1$ (where, N is a positive integer of 2 or more) smart antenna devices and by connecting output ports of two front-stage smart antenna devices to an input port of a rear-stage smart antenna device in a cascading pyramid form. In this case, preferably, the number of input ports is $2^N$ and the number of output ports is one.

Figure 5:
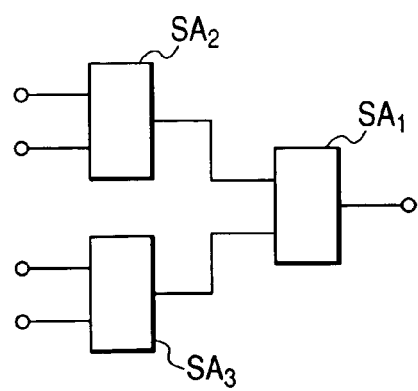
FIG. 5 is a view illustrating an example of a complex smart antenna device according to the invention.
Figure 6:
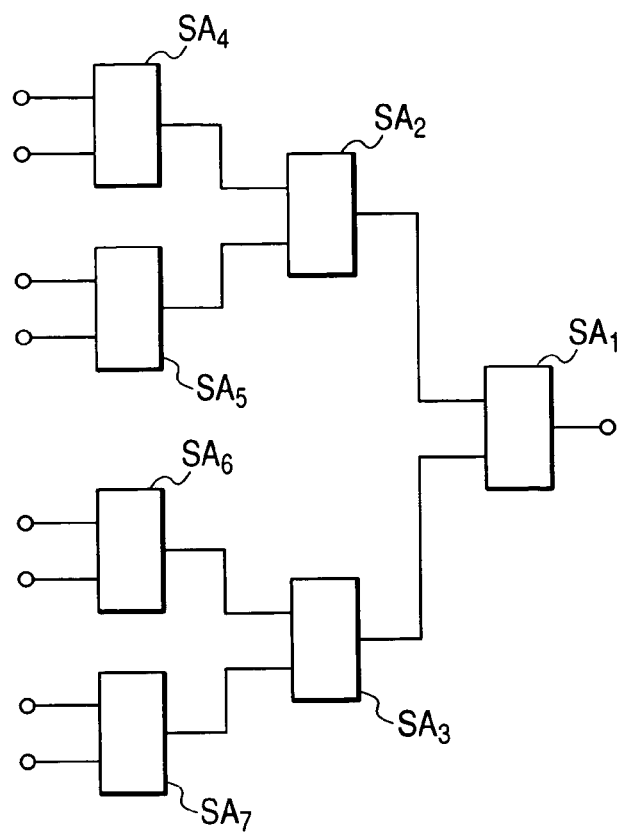
FIG. 6 is a view illustrating another example of the complex smart antenna device according to the invention.
Figure 7:
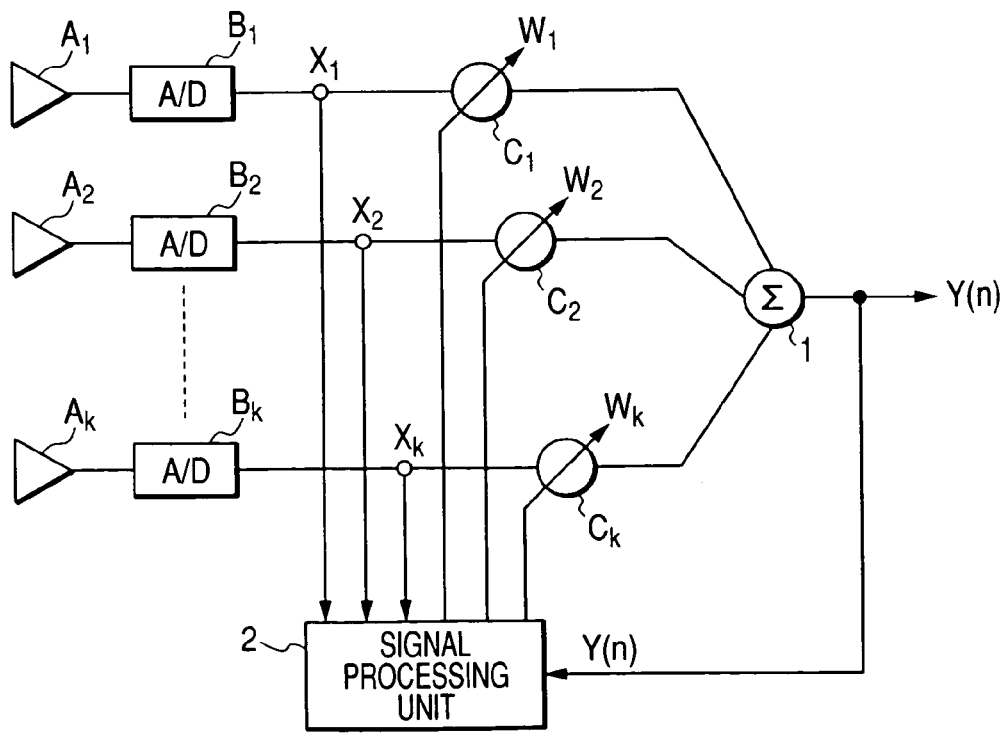
FIG. 7 is a view illustrating a conventional adapting antenna device.

For example, if N is 2, three smart antenna devices are used to configure a complex smart antenna device shown in FIG. 5. In this case, assuming that a two-input smart antenna device is SA, a four-input complex smart antenna device can be configured when output ports of front-stage smart antenna devices $SA_2$ and $SA_3$ are connected to input ports of a rear-stage smart antenna device $SA_1$.

Furthermore, if N is 3 and seven smart antenna devices SA are used, two smart antenna devices $SA_4$ and $SA_5$ are connected to input ports of a smart antenna device $SA_2$, and two smart antenna devices $SA_6$ and $SA_7$ are connected to input ports of a smart antenna device $SA_3$. Furthermore, a multi-input complex antenna device can be small-sized by putting smart antenna devices SA into an integrated circuit (IC).

According to the invention, since the smart antenna device includes the first and second weighting units that weight received signals inputted from the antennas, respectively; the operating unit that obtains the ratio of the weight of the second weighting unit to the weight of the first weighting unit; the adding unit that adds the signal outputted from the first weighting unit and the signal outputted from the second weighting unit to each other; and the phase shifting unit that makes phases of the two signals equal to each other, and when the magnitude of the signal component and the magnitude of the noise component of the signal inputted to the first weighting unit are assumed to be $S_1$ and $N_1$, respectively, and the magnitude of the signal component and the magnitude of the noise component of the signal inputted to the second weighting unit are assumed to be $S_2$ and $N_2$, respectively, the weight ratio is $(S_2/S_1) \times (N_1/N_2)^2$, S/N and amplitude of the signal after addition have the maximum value. In addition, a desired weight ratio can be simply obtained with the same analog signals, that is, without converting the analog signals into digital signals. In addition, there is an advantage that a condition on the maximum S/N ratio can be obtained in real time. Furthermore, since the operation itself is performed by using known circuits, the smart antenna device can have a simple configuration.

Further, in the smart antenna device, since the operating unit includes the first division circuit that obtains the ratio of the magnitude of the signal component outputted from the second weighting unit to the magnitude of the signal component outputted from the first weighting unit; the second division circuit that obtains the ratio of the magnitude of the noise component outputted from the first weighting unit to the magnitude of the noise component outputted from the second weighting unit; the squaring circuit that squares the output value of the second division circuit; and the multiplication circuit that multiplies the output value of the first division circuit by the output value of the squaring circuit, the weight ratio can be simply obtained by using an analog operating circuit.

Furthermore, in the smart antenna device, since the first and second separating units are further included, the first separating unit separating the signal component outputted from the first weighting unit from the noise component outputted from the first weighting unit and second separating unit separating the signal component outputted from the second weighting unit from the noise component outputted from the second weighting unit, and the separated signal components are input to the first division circuit and the separated noise components are input to the second division circuit, the weight ratio can be obtained by simply separating the signal component from the noise component.

Furthermore, in the smart antenna device, since each of the first and second separating units is composed of a first band pass filter and a second band pass filter, the first band pass filter passing within the band of the received signals and the second band pass filter passing the outside of the band of the received signals, the signal component can be simply separated from the noise component.

Furthermore, in the smart antenna device, since the weight setting unit that sets weights of the first and second weight units is further included and the signal representing the weight ratio is input to the weight setting unit, two weights can be set by inputting a voltage representing the weight ratio to the weight setting unit.

Furthermore, in the smart antenna device, since each of the first and second weighting units is composed of the variable gain amplifier and the weight setting unit is composed of the differential amplifier, the weighting unit and the weight setting unit can be implemented with a simple configuration.

Furthermore, according to another aspect of the invention, since the complex smart antenna device includes $2^N-1$ (where, N is a positive integer of 2 or more) smart antenna devices described above, the output ports of two front-stage smart antenna devices are connected to the input ports of the rear-stage smart antenna device in a cascading pyramid form, the number of input ports is $2^N$, and the number of output ports is one, a multi-input complex smart antenna device can be implemented.

The invention claimed is:

1. A smart antenna device comprising:

first and second weighting units provided to correspond to two antennas disposed apart from each other so as to weight received signals inputted from the antennas, respectively;

an operating unit that obtains a ratio of a weight of the second weighting unit to a weight of the first weighting unit;

an adding unit that adds a signal outputted from the first weighting unit and a signal outputted from the second weighting unit to each other; and a phase shifting unit that makes phases of the two signals equal to each other, wherein, when the magnitude of a signal component and the magnitude of a noise component of the signal inputted to the first weighting unit are assumed to be $S_1$ and $N_1$, respectively, and the magnitude of a signal component and the magnitude of a noise component of the signal inputted to the second weighting unit are assumed to be $S_2$ and $N_2$, respectively, the weight ratio is $(S_2/S_1) \times (N_1/N_2)^2$.

2. The smart antenna device according to claim 1, wherein the operating unit includes:

a first division circuit that obtains a ratio of the magnitude of a signal component outputted from the second weighting unit to the magnitude of a signal component outputted from the first weighting unit;

a second division circuit that obtains a ratio of the magnitude of a noise component outputted from the first weighting unit to the magnitude of a noise component outputted from the second weighting unit;

a squaring circuit that squares an output value of the second division circuit; and a multiplication circuit that multiplies an output value of the first division circuit by an output value of the squaring circuit.

3. The smart antenna device according to claim 2, further comprising:

a first separating unit that separates the signal component outputted from the first weighting unit from the noise component outputted from the first weighting unit; and a second separating unit that separates the signal component outputted from the second weighting unit from the noise component outputted from the second weighting unit, wherein the separated signal components are input to the first division circuit and the separated noise components are input to the second division circuit.

4. The smart antenna device according to claim 3, wherein each of the first and second separating units is composed of a first band pass filter and a second band pass filter, the first band pass filter passing within a band of the received signals and the second band pass filter passing outside of the band of the received signals.

5. The smart antenna device according to claim 1, further comprising:

a weight setting unit that sets weights of the first and second weight units, wherein a signal representing the weight ratio is input to the weight setting unit.

6. The smart antenna device according to claim 5, wherein each of the first and second weighting units is composed of a variable gain amplifier, and the weight setting unit is composed of a differential amplifier.

7. A complex smart antenna device comprising:
$2^N-1$ (where, N is a positive integer of 2 or more) smart antenna devices according to claim 1,
wherein output ports of two front-stage smart antenna devices are connected to input ports of a rear-stage smart antenna device in a cascading pyramid form, the number of input ports being $2^N$ and the number of output ports being one.

* * * * *